NATHAN WASHBURN.

Improvement in Molds for Casting Car-Wheels.

No. 116,246.  Patented June 20, 1871.

Witnesses.  N. Washburn
by his attorney.

116,246

UNITED STATES PATENT OFFICE.

NATHAN WASHBURN, OF WORCESTER, MASSACHUSETTS.

IMPROVEMENT IN MOLDS FOR CASTING CAR-WHEELS.

Specification forming part of Letters Patent No. 116,246, dated June 20, 1871.

*To all whom it may concern:*

Be it known that I, NATHAN WASHBURN, of the city and county of Worcester, of the State of Massachusetts, have made a new and useful invention having reference to the Founding of Cast-Metal Railway-Car Wheels with Steel Tires; and I do hereby declare the same to be fully described in the following specification, reference being had to the accompanying drawing making part thereof, and of which—

Figure 1:
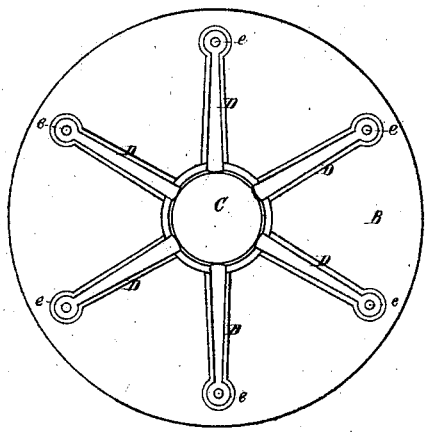
Figure 2:
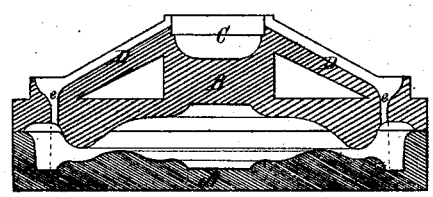

Figure 1 is a top view, and Fig. 2 a transverse section of my new or improved mold for the casting of such a wheel.

In making car-wheels in accordance with the method described in the patent of Zadock Washburn, numbered 97,327, and dated November 30, 1869, I have discovered that the welding of the cast metal to the steel tire will not take place until destruction of the flux resulted, and that owing to the flux there would be parts of the iron and steel which would be imperfectly welded or not welded at all. The gas resulting from the flux would operate to produce such a result and leave the wheel, when cast, with bubbles or cavities at the junction of the cast-iron with the steel tire or re-enforce. I have also discovered that by dispensing with the flux, and casting the iron directly against the inner surface of the heated steel re-enforce or rim a better result will follow, particularly when the metal is poured simultaneously into a series of sprues arranged close to the inner circumference of the re-enforce or tire, it having previously been the practice to cast the metal into a single sprue at or close to the hub or center thereof. When poured into the mold at or near its center the metal, in diverging therefrom in the mold, becomes so lowered in temperature, on reaching the re-enforce, as to frequently not properly weld to the re-enforce.

Figure 3:
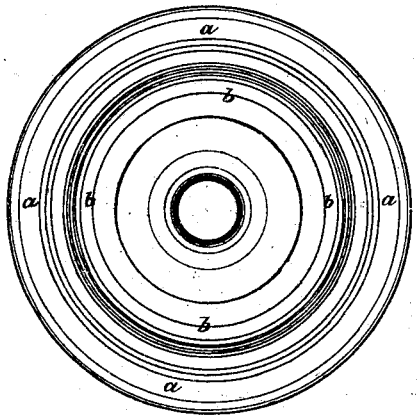
Figure 4:

The mold I employ for the manufacture of the car-wheel with the steel re-enforce or tire and a cast-iron body, the latter being founded against the re-enforce, while the latter is at a red heat in the mold, is shown in Figs. 1 and 2, the position of the re-enforce being exhibited in the latter figure by dotted lines. Fig. 3 is a side view, and Fig. 4 a transverse section of the wheel after being founded or produced.

The re-enforce or steel tire is shown at $a$, and the cast-metal body at $b$, in the drawing. The mold-bed A, in which the re-enforce or tire $a$ is placed, is provided with a cap portion, B, which is separable, and on its top is furnished with an elevated reservoir or cup, C, arranged at its center, and having a series of inclined spouts or conduits, D D, leading radially from it, and opening out of it at or near its top or upper edge. These conduits or channels lead into a series of sprues or holes or vertical conduits, $e\ e\ e$, opening into the matrix around it, and close to the inner circumference of the tire when placed in such matrix.

The molten metal is to be poured into the receiver C, from whence it will simultaneously be discharged through the several inclined conduits into the circular range of sprues, and directly against the inner periphery of the re-enforce or tire, thereby insuring a much better or more certain union of the cast-metal body and steel tire than when poured into the center of the matrix.

The wheel so made, being free from blow-holes or cavities in the weld, as produced by gases resulting from a flux, is a far better and stronger wheel than one made as described, with a flux applied to the re-enforce.

The mold is formed with a cavity to receive the re-enforce and a matrix for casting against the inner periphery of the re-enforce cast-steel body. Necessarily the re-enforce space and the body matrix form one cavity in the mold when it is without the re-enforce or tire.

I would remark that I make no claim to the invention of any thing or process described in the said patent of Zadock Washburn, although at present I am the assignee thereof, or substantially enjoy the exclusive right to make wheels in accordance with such patent.

I claim—

The improved mold as made with the cavity for the holding of the re-enforce, the matrix for the casting of the body, and with the series of sprue-holes, radial ducts, and central receiver, arranged substantially as described.

N. WASHBURN.

Witnesses:
  R. H. EDDY,
  J. R. SNOW.